United States Patent [19]
Fichera

[11] 3,873,485
[45] Mar. 25, 1975

[54] MOLDABLE AQUEOUS PLASTIC MASS OF POLYETHYLENE OXIDE FUMED SILICA AND POLYGLYCOL

[76] Inventor: A. Thomas Fichera, 1964 Bridgeport Ave., Claremont, Calif. 91711

[22] Filed: Apr. 3, 1974

[21] Appl. No.: 457,567

[52] U.S. Cl............... 260/29.2 EP, 46/1 R, 46/156, 106/272, 252/301.3 R, 273/58 J, 273/106 R
[51] Int. Cl. ... A63h 9/00, A63b 65/00, C08g 51/24
[58] Field of Search........ 260/29.2 EP; 46/156, 151, 46/1 R; 273/58 R, 58 J, 106 R; 106/271, 272; 252/301.3 R

[56] References Cited
UNITED STATES PATENTS

| | | | |
|---|---|---|---|
| 2,662,031 | 12/1953 | Vogel et al. | 260/29.2 EP |
| 3,006,872 | 10/1961 | Benedict et al. | 260/29.2 EP |
| 3,164,560 | 1/1965 | Suter | 260/29.2 EP |
| 3,383,280 | 5/1968 | Kuehns | 106/272 |
| 3,477,862 | 11/1969 | Forsyth | 260/29.2 EP |
| 3,627,546 | 12/1971 | Coppeta | 106/272 |
| 3,645,950 | 2/1972 | Stratta | 260/29.2 EP |
| 3,692,548 | 9/1972 | Packer | 260/29.2 EP |

*Primary Examiner*—Murray Tillman
*Assistant Examiner*—Arthur H. Koeckert
*Attorney, Agent, or Firm*—Polster and Polster

[57] ABSTRACT

A composition of matter in the form of a plastic mass useful as an educating and entertaining medium is made up essentially of polyethylene oxide, silica aerogel, one or more polyglycols with a molecular weight between 3,500 and 10,000, and water. The mass is non-Newtonian, has low internal rebound and is thixotropic, and it is virtually impossible to cause injury to any one or even to break single strength window glass by throwing a 30 gram mass as one would throw a baseball, even at a distance of 5 feet.

2 Claims, No Drawings

MOLDABLE AQUEOUS PLASTIC MASS OF POLYETHYLENE OXIDE FUMED SILICA AND POLYGLYCOL

BACKGROUND OF THE INVENTION

There are various compositions, plastic in nature, sold for the education and amusement of children, such as modeling clay, silicone "putty," and modeling compound such as is described in U.S. Pat. No. 3,156,440. These compositions are well suited to their particular uses. However, those which contain oils leave grease spots; those which contain organic vehicles which are also paint, varnish or wax solvents affect finished surfaces, and those which contain salt tend to encourage being eaten. All of the plastic compositions in common use heretofore have had an appreciable internal rebound and some are adhesive, so that, when thrown, they can injure persons or objects, and some of them tend to adhere to surfaces against which they may be thrown.

One of the objects of this invention is to provide a water based plastic mass which may be extruded, molded or manipulated manually, but which may be thrown against persons or things without injury to them by virtue of the impact of the mass.

Other objects will become apparent to those skilled in the art in the light of the following description.

SUMMARY OF THE INVENTION

In accordance with this invention, generally stated, a composition of matter is provided, comprising 0.01 to 0.5 percent by weight polyethylene oxide, .01 to 20 percent by weight fumed silica, .01 to .5 percent by weight polyglycol with an average molecular weight between 2000 and 10,000, and 70 to 90 percent water.

In the preferred embodiment, the polyethylene oxide is coagulant grade, and the polyglycol is one or more polyethylene glycols with an average molecular weight of 4,000 to 6,000. In addition, in the preferred embodiment, a biostat (sometimes referred to herein as growth inhibitor) such as potassium sorbate, a dirt-concealing pigment (sometimes referred to herein as hiding pigment) such as titania and a coloring agent (sometimes referred to herein as color) such as a fluorescent pigment are also used.

An illustrative example of plastic mass of this invention has the following composition expressed in percent by weight:

| Example | Percent |
| --- | --- |
| Polyethylene oxide | 0.2303 |
| Polyethylene glycol (average molecular weight 6000) | 1.1518 |
| Potassium sorbate | 0.2765 |
| Titanium dioxide | 0.1150 |
| Fluorescent pigment | 0.2303 |
| Silica aerogel | 14.9710 |
| Water | 83.0251 |

The glycol can be of the type sold commercially as Polyglycol E-6000 (a product of Dow Chemical Co.). The silica aerogel can be of a type sold commercially as Cab-O-Sil (a product of Cabot Corporation) or Santosil (a product of Monsanto Company), both fumed (pyrogenic silicas with particle sizes in the neighborhood of 0.007 microns. The polyethylene oxide is preferably coagulant grade, although a somewhat higher percentage (and correspondingly less water) of Polyox Wsr 301 (a product of Union Carbide Co.) can be used instead. The fluorescent pigment may be of any commercial type which is non-toxic in the quantities used, such as "Day Glo" AX series (products of Day-Glo Color Corp.).

The mass produced by intimate mixing of the foregoing ingredients is plastic, easily molded to fine detail, extruded, impressed or hand formed. It is non-toxic within all practical limits of ingestion, and non-irritating to skin and tissue. It has no adhesive tack. It has low internal kinetic rebound and is thixotropic. A handful may be thrown full force against a person or a window pane without injury to either. While it has no adhesive tack, if thrown against a nonporous surface it is held to the surface by a suction cup effect. If thrown against porous or fibrous surfaces, the flow properties of the mass permit mechanical interlocking. In either event, the mass is cohesive and can be removed mechanically from whatever surface it impinges upon.

The mass has a high, uniform shrinkage upon drying and upon complete drying is sufficiently friable to permit the mass to be pulverized and disposed of in any convenient manner.

While the example given constitutes the preferred embodiment for a mass to be used for the entertainment of children, the precise percentages given may be varied, to produce masses suitable for the same or other purposes. Merely by way of illustration, for example, Polyglycol 4000 may be added to the extent of 20 percent of the Polyglycol 6000, with a corresponding reduction of water. Different biostats may be employed, and the amount of water may be varied as different polyglycols and different polyethylene oxide are used. Propylene glycol may be used in place of some of the water to change the "hand" of the material and to serve as a humectant, although the substitution of one percent or more measurably increases the internal rebound of the material and may produce a slow-disappearing spot on rugs, fabrics and other surfaces on which the mass rests.

The essential ingredients are the polyethylene oxide, the silica aerogel, and the water. The polyglycols serve to modify the lattice spacing and to control slip, but other glycols may be used for this purpose.

The titanium dioxide and the fluorescent pigment are cosmetic although they are important in producing a commercially acceptable product. The potassium sorbate inhibits the growth of molds.

Useful products will be produced by using 0.01 to 0.5 by weight polyethylene oxide, 0.21 to 20 percent by weight finely divided silica, 0.01 5 percent by weight of a glycol, preferably with an average molecular weight between 2,000 and 10,000, and 70 to 90 percent of water, with or without the addition of pigments, dyes, or biostats.

Having thus described the invention, what is claimed and desired to be secured by Letters Patent is:

1. A composition of matter in the form of a plastic mass comprising 0.01 to 0.5 percent by weight coagulant grade polyethylene oxide, 0.01 to 20 percent by weight fumed silica, 0.01 to 5 percent by weight polyglycol with an average molecular weight between 2000 and 10,000 and 70 and 90 percent water.

2. A composition of matter in the form of a plastic mass consisting, by weight, essentially of about 0.25% coagulant grade polyethylene oxide, about 1.20% polyglycol with a molecular weight of between about 3500 and 6500, about 15.00% silica aerogel, about 0.12% hiding pigment, about 0.23% color, about 0.30% growth inhibitor and about 82.9% water.

* * * * *